Jan. 12, 1954  H. B. WEBER  2,665,423
EYE SHIELD
Filed June 2, 1951

INVENTOR.
Harriette B. Weber.
BY Frank C. Harman.
ATTORNEY

Patented Jan. 12, 1954

2,665,423

UNITED STATES PATENT OFFICE 2,665,423

EYE SHIELD

Harriette B. Weber, Saginaw, Mich.

Application June 2, 1951, Serial No. 229,613

4 Claims. (Cl. 2—15)

The present invention relates to improvements in eye shields for protecting the eyes of a person while sun bathing, and more particularly to an eye shield which is spectacle-shaped and utilizes formed eye cups to conform to the contour of the face and obstruct sun rays.

One object of the invention is to provide an eye shield for sun bathers which effectively protects the eyes and eyelids from harmful effects such as skin burn created by wind and sun rays.

Another object is to provide an eye shield which is attractively formed and can be used by persons who sleep during the day to obstruct sunlight, and which can be easily placed in position over the wearer's eyes and maintained in place.

Another object is to provide an eye shield in which a comparatively light clamping means is provided and utilized to insure against shifting or movement of the shield bodily from a position in front of the eyes.

Another object is to provide an eye shield of spectacle-shape having flexible yielding eye cups which fit the contour of the wearer's face beneath the eye so as to obstruct light rays at the sides and bottom portions of the shield when a sun bather is lying in a horizontal position and facing the sun rays.

Another object is to provide an eye shield having a flexible retaining wire or member therein which extends along the front and both sides of the wearer's head and terminates with its ends in back of the head to embrace the head and prevent lateral shifting or movement of the eye shield with respect to the wearer's face and eyes.

Another object is to provide an eye shield having decorative elements on the outer face thereof to enhance the appearance and provide an eye shield which is pleasing to the aesthetic sense.

Another object is to provide an eye shield which is constructed of durable flexible fabric so that it may be conveniently carried in the pocket of the user without fear of breaking or crushing the eye shield, or otherwise damaging the same.

Another object is to provide an eye shield which lends itself readily to easy and inexpensive manufacture.

Other objects and advantages of the invention will appear herein and become apparent with reference to the following description taken in conjunction with the accompanying drawing wherein.

Figure 1:
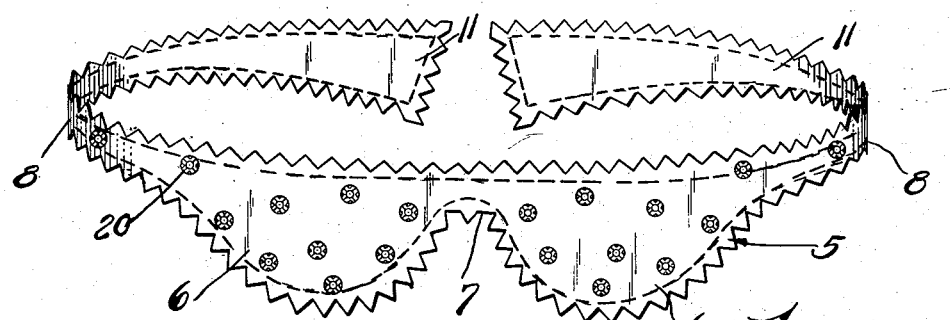
Figure 1 is a perspective view looking at the front of the eye shield and showing the general shape thereof, and the decorative elements on the outer facing.
Figure 2:
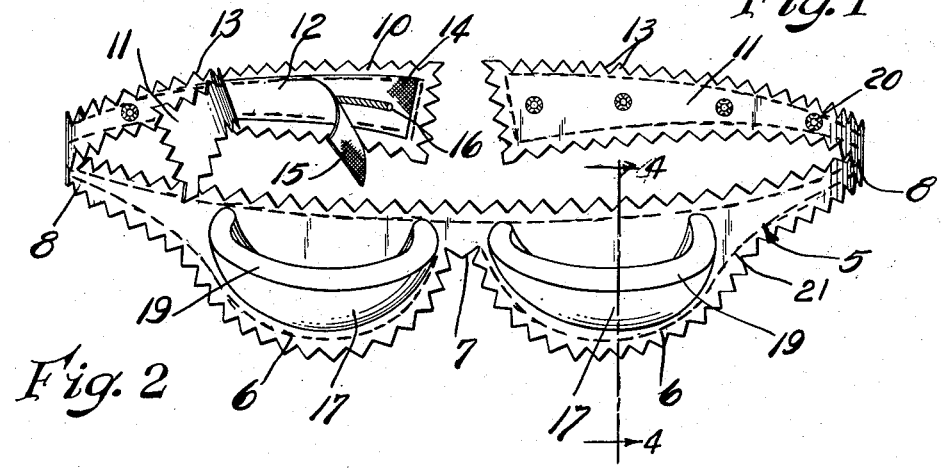
Figure 2 is a perspective view looking at the rear, showing the eye cups on the eye shield portions and illustrating one of the temple and head embracing ends of the shield disassembled to expose the component elements of the shield and particularly the flexible band and retaining wire.

Referring to the drawing, and more in detail, there is shown for the purpose of convenience of illustration a mask or shield generally indicated at 5 which may be attractively formed of felt or any suitable flexible material of various colors. The shield 5 is spectacle-shaped or substantially so to form semi-circular blinder elements or portions 6, a notch 7 to straddle the nose of the wearer, and temple elements 8 which are decoratively decreased in width to engage the temple and rear portions of the wearer's head, the extreme free ends being widened (Figures 1 and 2).

The mask 5 is preferably formed of inner and outer opaque facings 10 and 11 which are identically cut to resemble a spectacles and said facings 10 and 11 are serrated around their edges as at 13 to enhance the appearance of the finished product.

Mounted between the inner and outer facings 10 and 11 is a retaining band 12 formed of a pair of adhesive strips 14 and 15 which are likewise identically cut and are shaped spectacle-wise. Arranged between the adhesive strips 14 and 15 and the band 12 is a resilient retaining wire 16 which is arcuately shaped to conform to the front, sides and rear of the wearer's head. The resilient arcuate member 16 may be formed of a single strand of wire or a plurality of twisted strands to increase its resiliency.

The band 12 is formed of adhesive strips 14 and 15 with the adhesive sides thereof placed together in face to face contact so as to effectively secure the resilient wire 16 therebetween, or its components may be cut spectacle-wise similar to the facings 10 and 11 and the wire 16 stitched therebetween. In either case, the band 12 is mounted between the inner and outer facings 10 and 11 and said facings are stitched along both marginal edges around the shield portions 6 and temple portions (Figures 1 and 2). The stitching, if desired, is such as to follow the contour of the serrated edge 13 or may be formed by a straight row of stitching 21 embracing both sides of the band 12.

Mounted on the inner facing 10 and on the semi-circular eye shield portion 6 is a pair of eye cups 17 which are formed of one or more thicknesses of cotton to provide arcuate segments with the arcuate edges positioned transversely outwardly to conform substantially to the facial contours contiguous the eyes. The eye cups 17 are provided with arcuate or curved engaging surfaces 19 which engage the face beneath the lower eyelid to thereby obstruct light rays and prevent the same from passing to the eyes of the wearer W. The semi-circular eye cups 17 are stitched or otherwise secured along one arcuate edge to the inner facing 10 in such a manner as to project rearwardly toward the eyes of the wearer W and engage the face F beneath the lower eyelids.

Decorative trimmings may be applied to the outer facing 11 such as rhinestones 20 which are secured to the semi-circular portion 6 and temple portions of the eye band in symmetrical relation.

Figures 3, 4:
Figure 3 is a perspective view of the eye shield showing the manner in which the same is positioned on the face of a sun bather to shield the eyes against sun rays.
Figure 4 is a transverse cross-sectional view taken on line 4—4 of Figure 2 and looking in the direction of the arrows to show the manner in which the shield is positioned over the eyes of a sun bather and illustrate how closely the eye cups fit the irregular contours of the face contiguous the eyes.

In the application and operation of the invention, the spectacle-like shield is placed over the eyes of the wearer W as shown in Figures 3 and 4 to protect the eyes from the sun and wind with the arcuate band 12 engaging the forehead, temples and rear of the wearer's head and thereby firmly secure the shield in position. The flexible eye cups are shaped to fit the contours of the face adjacent the lower eyelides and effectively block out all light. No protective casing is necessary to preserve the shield from harm, and it may be handily carried for personal use in a pocket if desired.

Thus, it will be seen that when the eye shield is in place on the face of the wearer F, the semi-circular cup-shaped members 17 will engage the face beneath the lower eyelids on opposite sides of the nose which will prevent the shield from shifting both laterally and vertically. The resilient retaining wire 16 is arranged to embrace the head of the wearer at the temple and rear portions and thus urge the inner facing 10 into frictional engagement therewith. If the inner facing 10 is formed of a fabric having a relatively heavy nap such as velvet or velour, the eye shield will be effectively held in place by reason of the frictional engagement between the nap and the wearer's head.

While the invention illustrated and described is illustrative of the preferred form of the construction of the invention, it is to be understood that the same does not limit the invention to the precise details of structure shown and that other variations and modifications may come within the scope of the appended claims.

I claim:

1. In an eye shield, a pair of flexible fabric members shaped to provide a mask having eye covering portions, a flexible band mounted between said flexible fabric members formed of a pair of adhesive strips with their adhesive faces in facial contact, a flexible retaining member mounted between said adhesive strips and shaped to embrace the face, temple and rear portions of the wearer's head, and a pair of arcuately curved light obstructing substantially semi-elliptic strips each secured along one entire edge thereof to the inner face of said mask to engage the face of the wearer beneath the lower eyelid, the elliptic edges of said arcuate light obstructing strips forming curved face engaging portions conforming to the irregularities of the contiguous facial surfaces.

2. In an eye shield, a mask formed of a pair of inner and outer fabric strips shaped to provide a pair of spaced eye covering portions, and head embracing portions, a pair of flexible adhesive strips arranged in face to face contact and mounted between said fabric strips to extend the entire length thereof, a flexible resilient wire retaining member sandwiched between said adhesive strips and shaped to conform to the forehead and head curvature to yieldingly engage the head of the wearer and retain said mask in position, and a pair of arcuate fabric strips each secured along one entire edge thereof to the lowermost edge of the eye covering portions, said strips being provided with curved facial contour engaging surfaces to conform to the user's face below the lower eyelid.

3. In an eye shield, a mask formed of a pair of inner and outer fabric strips shaped to provide a pair of spaced eye covering portions intermediate the ends thereof, a pair of flexible adhesive strips arranged in face to face contact and secured between said fabric strips by stitching at the marginal edges thereof to extend the entire length of said mask, a flexible resilient wire retaining member sandwiched between said adhesive strips and shaped to conform to the front and sides of the wearer's head to yieldingly and frictionally engage the head of the wearer and retain the mask in position, and arcuate strips formed of flexible fabric material each secured along one entire edge thereof to said eye covering portions to engage the face beneath the lower eyelid, said strips being provided with curved facial contour-engaging surfaces to conform to the user's face below the lower eyelid.

4. In an eye shield, a pair of flexible fabric members shaped to provide a mask having eye covering portions, a flexible retaining member secured between said flexible fabric members and shaped to embrace the face, temple and rear portions of the wearer's head, a pair of arcuately curved, light-obstructing, substantially semi-elliptical strips, each secured along one entire edge thereof to the inner face of said mask to engage the face of the wearer beneath the lower eyelid, the elliptic edges of said arcuate light-obstructing strips forming curved face-engaging portions conforming to the irregularities of the contiguous facial surfaces.

HARRIETTE B. WEBER.

References Cited in the file of this patent

UNITED STATES PATENTS

| Number | Name | Date |
| --- | --- | --- |
| 431,299 | Wheeler | July 1, 1890 |
| 1,006,945 | Houston | Oct. 24, 1911 |

FOREIGN PATENTS

| Number | Country | Date |
| --- | --- | --- |
| 211,351 | Germany | June 28, 1909 |
| 343,079 | Great Britain | Feb. 13, 1931 |